United States Patent [19]

Leonard

[11] Patent Number: 4,564,177
[45] Date of Patent: Jan. 14, 1986

[54] CLAMP FOR NON-BEADED PNEUMATIC ASSEMBLIES

[75] Inventor: Daniel J. Leonard, Oaklandon, Ind.

[73] Assignee: The Firestone Tire & Rubber Company, Akron, Ohio

[21] Appl. No.: 487,327

[22] Filed: Apr. 21, 1983

[51] Int. Cl.⁴ ............................................. F16F 9/54
[52] U.S. Cl. .................................. 267/64.24; 267/35
[58] Field of Search ................. 267/35, 63 R, 64.19, 267/64.21, 64.23, 64.24, 64.27, 140.1, 153

[56] References Cited

U.S. PATENT DOCUMENTS 1,160,321 11/1915 Rice .................................. 267/64.24
2,960,333 11/1960 McGavern et al. ............. 267/64.24
3,596,895 8/1971 Hirtreiter ......................... 267/64.24

Primary Examiner—Duane A. Reger
Attorney, Agent, or Firm—Ronald Brietkrenz

[57] ABSTRACT

A multi-part clamp holds the end of an airspring bellows and also serves to fasten it to its support arm.

7 Claims, 7 Drawing Figures

CLAMP FOR NON-BEADED PNEUMATIC ASSEMBLIES

BACKGROUND OF THE INVENTION

Pneumatic airspring devices for use either as isolators, in place of other springing elements, or as actuators, typically take the form of a single convolution bellows, usually of cord-reinforced rubber or plastic, and terminating at one end in a relatively small end structure which, during compression of the device, is capable of passing into the larger-diameter body portion.

The smaller end usually terminates in an enlarged, reinforced bead which is adhered or crimped to a metal pedestal or piston forming one of the members separated by the airspring. Such a device may be seen in U.S. Pat. No. 3,078,086 to Bank, and owned by the assignee of the present invention. One of the drawbacks of present structures is that the assemblies are, in many cases, irreversible, i.e., attempts to dissasemble the combination result in destroying either the bellows portion or the metal members, or both.

SUMMARY OF THE INVENTION

In order to overcome the problem of destruction of components in disassembly, and simultaneously to provide an improved means for assembling the end of the bellows with its mount or end structure, and with the supporting arm, the present invention comprises a clamp member which cooperates with a pedestal or piston to clamp and lock the bellows end, and is itself engaged by a threaded device which draws the base of the piston against its support arm.

DESCRIPTION OF PREFERRED EMBODIMENTS

Figure 1:
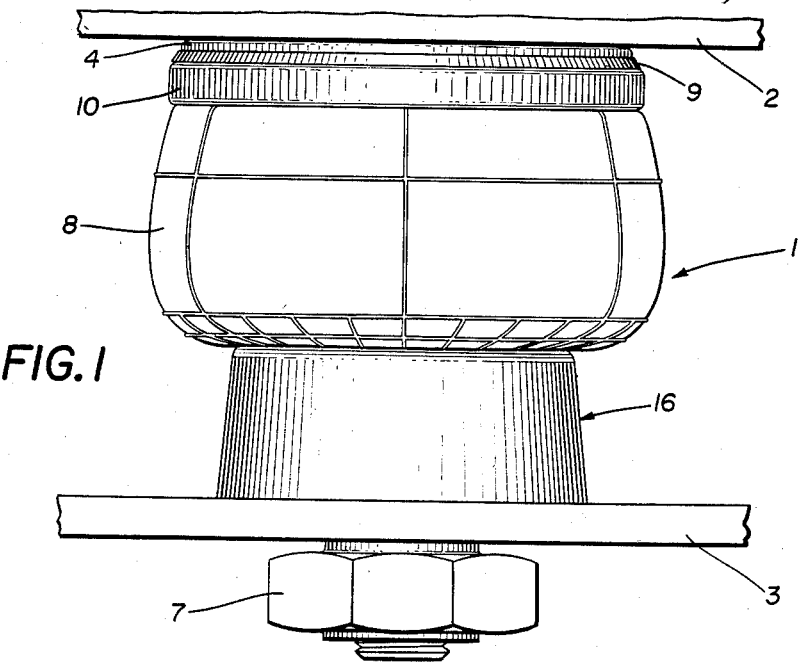
FIG. 1 is a front elevation of an airspring device in place between a frame and an arm.

The airspring 1 is shown operatively installed in FIG. 1 between an upper support such as a frame 2 and a lower support such as arm 3. In FIG. 2 the device is again in the extended position, while FIG. 3 shows it in the compressed position. The upper clamp 4 is secured to arm 2 by fastener 5, while the lower clamp 6 is fastened to arm 3 by a threaded nut 7. Between upper and lower clamps is located a resilient bellows body 8 preferably made of rubberized cord material or plastic, and so constructed as to allow the airspring to extend and compress smoothly and without wrinkles. The upper edge 9 of the airspring is sealed and held in position against the upper clamp 4 by a metal ring 10. The lower edge portion 15 is sealed and fastened in the manner to be described.

Figures 4, 7:
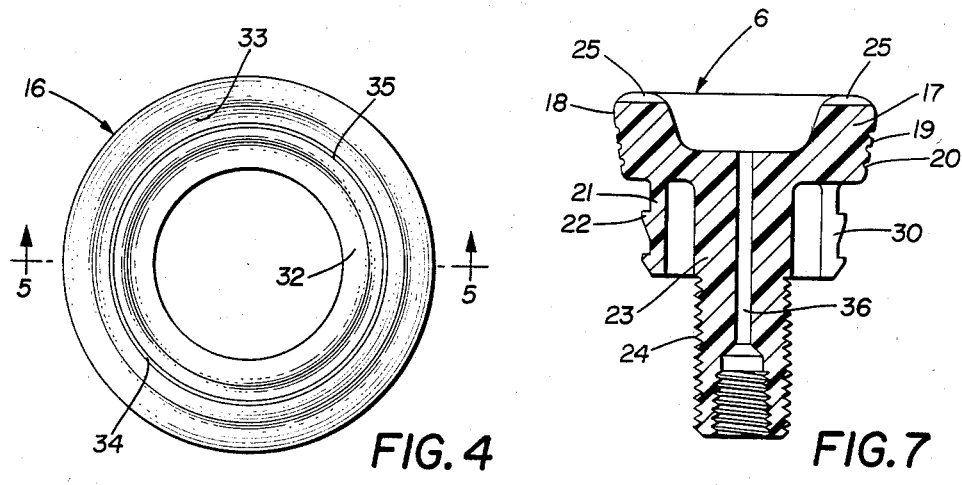
FIG. 4 is a top plan view of the piston of the invention.
FIG. 7 is a vertical section on lines 7—7 of FIG. 6.
Figure 6:
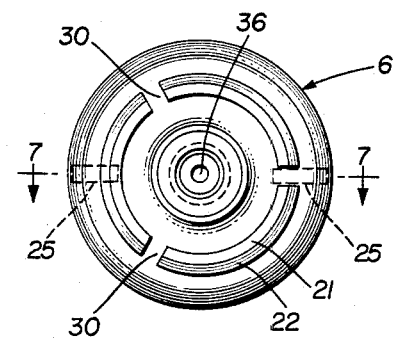
FIG. 6 is a bottom plan view of the lower clamp.

The lower mount means comprises the lower clamp 6, a piston 16 cooperating therewith, and a nut 7 to draw and hold the lower clamp-piston assembly against the lower support 3. As best seen in FIGS. 6 and 7, the lower clamp 6 is a generally axially extending member with an enlarged disk-shaped head portion 17, a flared outer surface portion 18 of which is formed with annular ribs 19 separated by annular grooves 20. Extending axially from the head 17 and coaxial therewith is a cylindrical skirt 21, the radially outer surface of which is provided with a series of axially spaced circumferential barbs 22. Also extending axially from the head 17 and likewise coaxial therewith is a center stem 23 located radially inwardly of the skirt and threaded externally as at 24. The stem is also coaxial with the skirt 21, but extends axially beyond it, through the opening in support 3, to receive the nut 7.

The top of head 17 is grooved radially as at locations 25 to allow air to pass freely into bellows 8 in the compression position seen in FIG. 3.

The skirt 22 may be slit axially, as at 30, for ease of assembly with the piston 16.

A passage 36 in stem 23 allows air under pressure to be supplied to the interior of the device.

Figure 5:
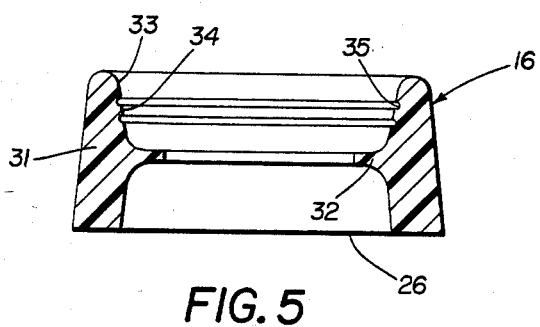
FIG. 5 is a vertical section on lines 5—5 of FIG. 4.
Figure 2:
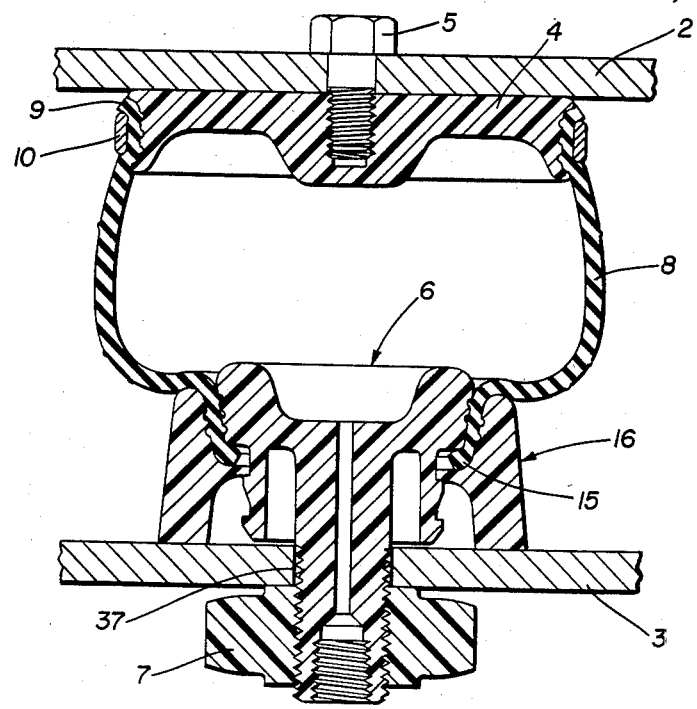
FIG. 2 is a vertical section of the airspring device, in its extended position.
Figure 3:
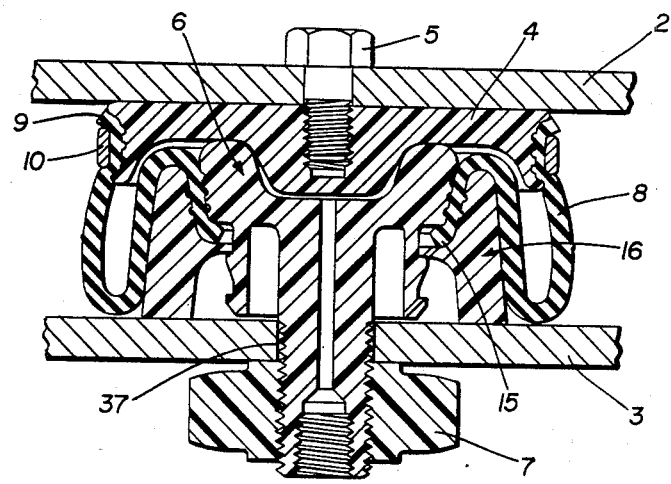
FIG. 3 is a section similar to FIG. 2, but in the compressed position.

The piston 16 is shown assembled with the lower clamp 6 in FIGS. 1, 2, and 3; in FIGS. 4 and 5 it is depicted as having an annular body 31 with a radially inwardly extending ramp portion 32 adapted to snap over and lock with the barbs 22 on skirt 21.

The upper radially inner surface of the piston is cupped as at 33 and formed with annular ribs 34 and grooves 35.

In assembling the combination, the lower edge position 15 of the bellows is first placed between the piston cup 33 and the flared outer face 18 of the lower clamp 6; the piston 16 is slid axially along the skirt 21 of the clamp with its ramp 32 snapping over and resting on the upper barb 22 as the bellows edge 15 is reached and clamped between piston surface 33 and clamp surface 18. The ribs 19 and grooves 20 in opposition to ribs 34 and grooves 35 aid in the clamping and sealing. The slits 30 in the skirt facilitate snapping the piston into position.

The bellows 8 is assembled with upper clamp 4 by means of metal ring 10 engaging and sealing the bellows edge 9. Fastener 5 is threaded into clamp 4 to secure it against arm 2.

With the lower edge 15 of the bellows 8 clamped by the piston, the length of the stem 23 is such that its threaded portion 24 can extend through an opening 37 in the lower support arm 3. Tightening of nut 7 against the lower support 3 will maintain the bellows edge securely between clamp surface 18 and surface 33 of the piston 16, whose base 26 is held against support 3.

I claim:

1. An apparatus for clamping a non-beaded end of an airspring bellows to a piston means comprising:
   (a) piston means having a generally annular opening adapted to receive said end of said airspring bellows therein, wherein said generally annular opening has associated therewith an inwardly extending ramp;
   (b) clamp means having a first end and a second end, said second end having a frustrum shaped portion adapted to coact with said annular opening and said inwardly extending ramp of said piston means in order to retain said non-beaded end of said airspring bellows between said piston means and said clamp means wherein said clamp means includes barb means adapted to coact with said ramp in order to cause said non-beaded end of said airspring bellows to be retained between said piston means and said clamp means.

2. The apparatus of claim 1 wherein said annular opening has an irregular surface associated therewith.

3. The apparatus of claim 1 wherein said frustrum shaped portion of said clamp means has an irregular surface associated therewith.

4. An apparatus for clamping a non-beaded end of an airspring bellows to a support comprising:
  (a) piston means having a generally annular opening adapted to receive said end of said airspring bellows therein, wherein said generally annular opening has associated therewith an inwardly extending ramp, and said piston means is affixed to said support;
  (b) clamp means having a first end and a second end having a frustrum shaped portion adapted to coact with said annular opening and said inwardly extending ramp of said piston means in order to retain said non-beaded end of said airspring bellows between said piston means and said clamp means; and
  (c) fastening means adapted to engage said second end at said clamp means wherein said clamp means retains the non-beaded end of said airspring bellows between said clamp means and the annular opening of said piston means and further wherein said piston means is thus biased against said support.

5. The apparatus of claim 4 wherein said clamp means includes barb means adapted to coact with said ramp in order to cause said non-beaded end of said airspring bellows to be retained between said piston means and said clamp means.

6. The apparatus of claim 4 wherein said annular opening has an irregular surface associated therewith.

7. The apparatus of claim 4 wherein said frustrum shaped portion of said clamp means has an irregular surface associated therewith.

* * * * *